Sept. 2, 1930.  L. HONIGMANN ET AL  1,774,554
APPARATUS FOR THE RECOVERY OF DRY DISTILLATION MATERIAL
Filed June 2, 1926  2 Sheets-Sheet 1
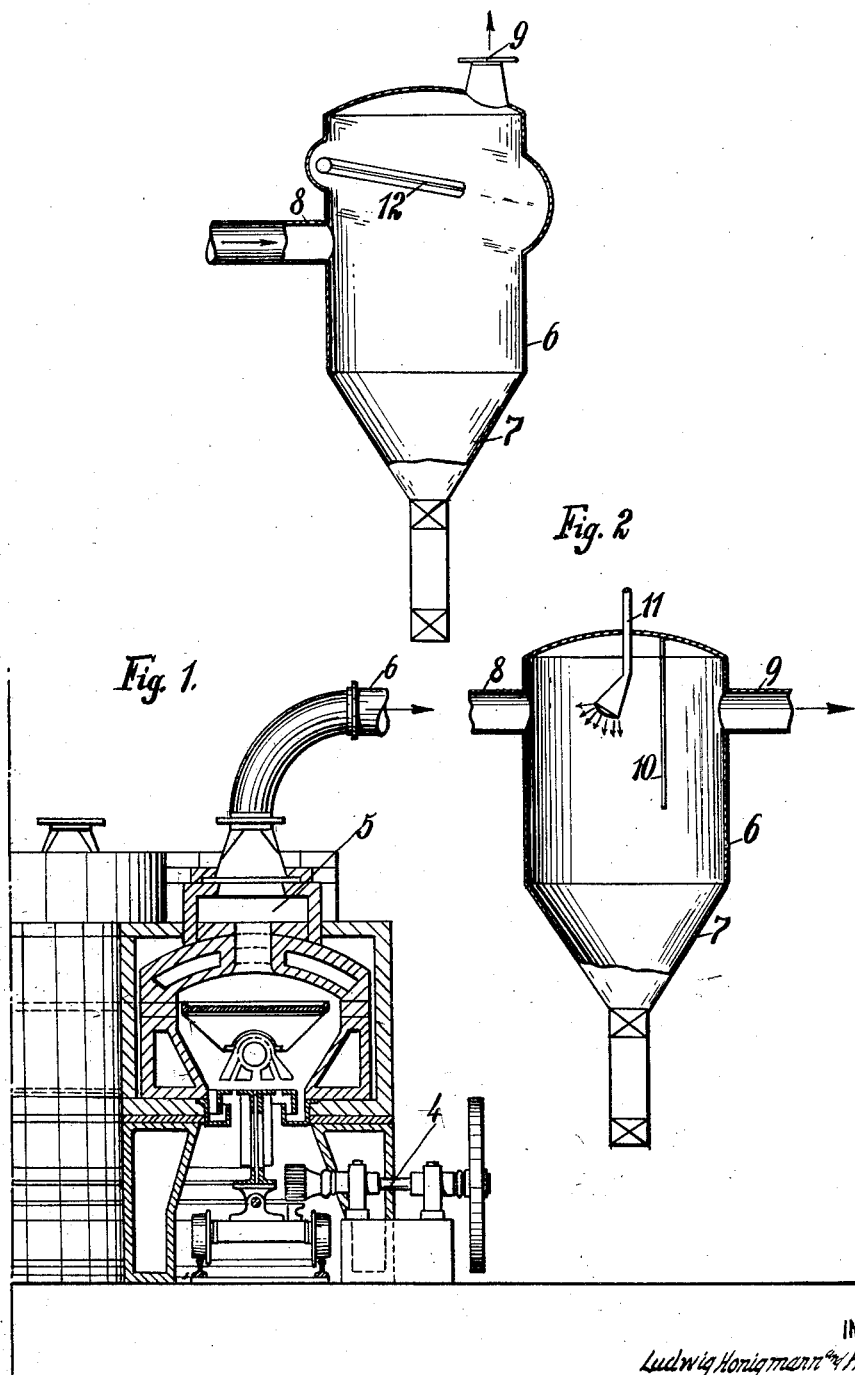

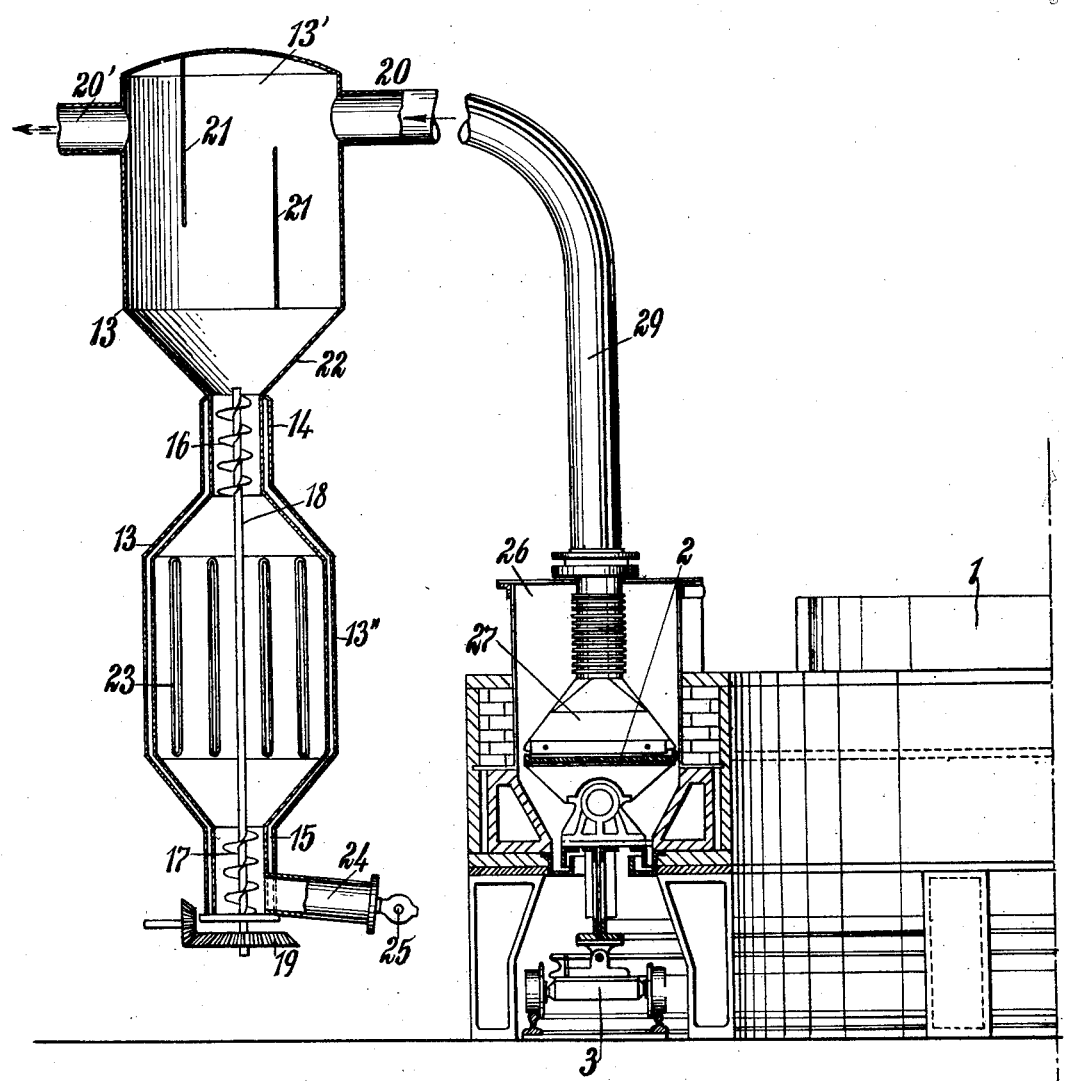

Patented Sept. 2, 1930

1,774,554

UNITED STATES PATENT OFFICE

LUDWIG HONIGMANN, OF BAD TOLZ, AND FRIEDRICH BARTLING, OF MUNICH, GERMANY

APPARATUS FOR THE RECOVERY OF DRY DISTILLATION MATERIAL

Application filed June 2, 1926, Serial No. 113,285, and in Germany June 2, 1925.

It is known that the dry distillation gases escaping from dry distillation ovens carry off large quantities of dust-like matter; it is also known to carry off fine granular or dust-like material from the discharge point of the oven by means of a gas current. In both cases this dust-like or fine granular material is obtained in a very hot condition, and since the admission of air is liable to produce an explosive tendency in such heated dust-like materials, it has hitherto been the regular custom to moisten this material, for example, by injecting water in a finely divided condition into the dust separator traversed by the hot distillation gases. This moistening is disadvantageous from various points of view. In the case of dust carrying distillation gases which are taken from the distilling zones proper of the oven and which in addition to dust carry also a relatively large quantity of volatilized oils and similar very valuable substances, the result of the moistening is usually that these very valuable substances are precipitated and the bulk of them is lost and cannot be recovered. But even in those cases in which masses of dust are contained in the gases without any material admixtures of volatilized oils, for example, in the case of fine granular or dust-like material taken from the discharge point by means of a gas current, the moistening of the hot dust-like material by means of water while avoiding thereby the direct danger of explosions, has the defect that the material is obtained in a damp condition necessitating therefore subsequent drying treatment which is cumbersome, costly and laborious.

Irrespective, therefore, of whether the gases to be freed from the dust contain, in fact valuable oils or not, it is of some importance to avoid the moistening thereof by means of water or the like, and this is the object of the present invention.

For this reason according to the invention, a process for the recovery of dust-like distillation material from hot gas currents resides in conducting the over gases through dust separators which are provided with means for precipitating the suspended dust without moistening or like operations. In the case of gases which at the same time carry volatilized oils and dust-like material, such as for example, distillating gases, the process is carried out by causing a current of super heated steam to be blown in counter current into the stream of the distillation gases. It has been found that super heated steam if introduced into the oil carrying gas current in very fine division, exhibits the property of precipitating the dust in a substantially dry condition. Moreover, super heated steam prevents the volatilized oils carried with the dust in the gas from being precipitated, the condition being always that a steam is used of which the temperature lies above the condensation point of the oil, whereby the precipitation of the oil is prevented without difficulty.

In general the gases are subjected to the process in a condition in which they are on their immediate exit from the distilling oven. At this point the gases usually have a temperature between 350 and 450° C.; the condensation point of the tar oils to be recovered lies at about 180° C.

In these circumstances a condensation of the oils is safely avoided if super heated steam of about 300° is employed. The precipitation of the dust is according to experience, effected without any moistening action, that is to say, presumably by the impact of the particles of the dust carrying gases on the particles of the super heated steam, whereby as it would seem, the dust particles are thrown out. For this purpose it is sufficient for the flowing velocity of the steam to be the same as prevails at the steam outlet nozzle of a super heater connection. By preference, therefore, the finely divided steam is used at a pressure of about 3—4 atmospheres.

According to a particularly preferable mode of performing this portion of the process, a current of super heated steam is blown against the stream of the distillation gases. In a modified form of the process a thin veil of super heated steam may be blown across the path of the gas current. This steam veil allows the gas carrying the valuable volatilized constituents to pass through but not the dust which is precipitated without becoming considerably moistened.

For performing the process, novel devices of various kinds may be employed.

In order to force the super heated steam in counter current through the gas stream, use is made according to this invention of a closed receptacle containing a dust collector in its lower part, and provided in its head portion between the gas inlet and the gas outlet with a baffle, and on the side facing the inlet with a steam jet device having its outlet opposite to the entering gas. In order to produce a thin veil like jet across the path of the gas current, use is made by preference of a slotted tube arranged between the gas inlet and the gas outlet in a closed chamber.

If it is desired to separate out large masses of dust and fine granular matter carried with the gas current, by means of which latter the material is carried off from the discharge point of a dry distillation oven, the gas current carrying the dust masses contains inconsiderable quantities of valuable oils. In this case, therefore, the consideration of these oils takes a minor place when compared with the intention to cool the collected large masses of dust in a proper manner with the exclusion of air when it is essential if possible to avoid the moistening of the material. As the precipitation of the oils is here of minor consideration, the separation can be effected without the aid of super heated steam simply by a mechanical method, for example, by means of deflectors or the like.

Accordingly a further feature of the invention resides in an arrangement for cooling the pulverulent or fine granular distillation product obtained according to the novel process by attaching to the outlet hopper of the dust separator a closed receptacle provided with cooling means with inlet worm at the upper end and outlet worm at the lower end, which are driven in unison and are kept charged with the pulverulent material so as to constitute a gas-tight closure. As in this case the entry of oxygen is entirely excluded, it is possible to cool the recovered dust-like material to an approximate temperature without necessitating moistening of the dust for the avoidance of the risk of explosion. In a preferred construction, the two worms are mounted on a common driving shaft. Moreover, at the exit of the cooled material, a closing device is arranged by means of which the material is caused to become crowded with the discharge worm acting as agitator therein. In this way the cooling receptacle may be kept constantly filled with dust-like or finely granular material, and the excess thereof may be withdrawn in a continuous manner.

Two constructional forms of apparatus according to this invention are illustrated by way of example in the accompanying drawings in which:

Figs. 1 and 1ª are fragmentary sectional views of different modifications of a dry distilling oven equipped with the devices according to this invention; and Fig. 2 is a modified construction of the dust separator shown in Fig. 1.

The oven shown should be imagined to have been divided centrally for the sake of economy in space Fig. 1 illustrating the right half, and Fig. 1ª the left half thereof. The oven is of the known type comprising inside a ring shaped muffle 1, a circular revolving hearth 2 onto which the material is charged from the charging point in the form of a thin layer. The hearth 2 is supported on a travelling structure 3, and is kept revolving by means of a driving gear 4. In this action it carries the dust-like material from the charging point (not shown) to the discharge point shown in Fig. 1 through the whole annular oven chamber, where it is subjected to dry distillation by the action of heat. The resulting gases are taken out of the oven chamber at suitable points of which there may be several distributed over the circumference of the oven, such as indicated at 5 in Fig. 1. At this point a pipe 6 is shown to terminate in the oven chamber by way of which the distillation gases may be sucked from the oven chamber by appropriate means. These distillation products contain in addition to the suspended dust-like material, a relatively large quantity of valuable oils which must be recovered as much as possible. To this end use may be made of the device shown in Fig. 1 or of the modified device shown in Fig. 2.

In both these constructional forms shown in Figs. 1 and 2, the device comprises a closed receptacle terminating at the bottom in a dust collector 7 in a known manner. In the construction according to Fig. 1 the gas inlet 8 is provided in the upper part of the receptacle on one side, and the gas outlet 9 opposite to it on the other side. Arranged between them is a baffle plate 10, and in front of the latter on the inlet side a sprayer 11 facing the gas inlet, and used for the blowing in of super heated steam. By the action of the steam emerging from the sprayer, the dust particles contained in the incoming gas current are precipitated, the baffle plate 10 causing a retardation of the gas flow. The gas freed from dust passes through the gas outlet 9 to a condensation plant in which the valuable constituents are recovered in known manner.

According to the construction shown in Fig. 2, the gas outlet socket 9 is arranged not opposite to the gas inlet 8, but extends vertically from above downwardly into the receptacle. The gas is thus forced to travel along a curved path. Obliquely built into the receptacle is a horse-shoe shaped pipe 12 which is provided with a narrow slot over its whole length. Through this slot super heated steam is blown in so as to produce a steam veil across the path of the gases.

By means of the construction shown in Fig. 1a, the total quantity of the dust-like or fine granular material is to be taken out at the discharge point of the oven after the dry distillation of the material. To this end there is provided a container 26 open at the bottom to a suction head 27 which wipes on the revolving hearth 2. With the aid of appropriate means the total quantity of the material is here sucked away by a current of air passing through a pipe 29. Attached to this pipe 29 is the device for the precipitation, collection and cooling of the dust-like or fine granular material.

A substantially cylindrical container 13 is provided approximately centrally and at the lower end with tubular restrictions 14 and 15 respectively. Snugly fitted in these restrictions are worms 16 and 17 which, as shown, are mounted on a common driving shaft 18 and driven in unison in the same direction from a train of gears 19.

The head portion 13' of the container has a gas inlet 20 and a gas outlet 20' so that it is transversely traversed by the gases charged with the material resulting from the distillation. Interposed in the path of the gas stream are baffle plates 21 so that by the whirling movements produced, the dust particles are separated out from the gas stream and are caused to drop into the hopper 22. The lower portion 13'' of the receptacle is constructed to form a surface cooler. It is surrounded inclusive of the tubular portions 14 and 15 by a cooling jacket, and in its interior is equipped with water cooled heat exchanging surfaces 23 of any desired construction. Arranged adjacent the lower end of the worm 17 is a discharge spout 24 adapted to be closed and controlled at will by a slide 25 or the like.

The operation of this device is as follows:

The granular or dust-like distillation material separated from the gas current in the manner indicated, collects in the hopper 22. When now the worms 16 and 17 are set in motion, the material is fed through the cooler. By preference the controlling member 25 is closed so as to cause the material to crowd in the cooler. In this condition it is stirred by the worm 17 which continues to rotate. After then opening the slide 25 the cooled material is discharged in a continuous current.

What is claimed and desired to be protected by Letters Patent is:—

1. In an apparatus for cooling dust-like or granular dry distillation material, a closed receptacle to which the material is transmitted, feeding and discharging elements at the upper and lower ends, respectively, of said receptacle, cooling devices in said receptacle, and means to drive said feeding and discharging elements in unison, said elements being kept charged with the pulverulent material so as to produce a gas-tight closure at the outlet end of the receptacle.

2. In an apparatus for cooling dust-like or granular dry distillation material, a closed receptacle to which the material is transmitted, feeding and discharging elements at the upper and lower ends, respectively, of said receptacle, cooling devices in said receptacle, and a shaft common to said elements and operable to drive the same in unison.

3. In an apparatus for cooling dust-like or granular dry distillation material, a closed receptacle to which the material is transmitted, feeding and discharging elements at the upper and lower ends, respectively, of said receptacle, cooling devices in said receptacle, means to drive said feeding and discharging elements in unison, said elements being kept charged with the pulverulent material so as to produce a gas-tight closure at the outlet end of the receptacle, and a closure at said outlet end forming a stop for the cooled material to confine the same adjacent said end whereby said discharging element will agitate the confined material.

4. In an apparatus for cooling dust-like or granular dry distillation material, a dust collector having a discharge hopper at its lower end, a cooling receptacle below said collector and connected to said hopper, a feeding worm in the upper end of said receptacle kept filled by material from said hopper, a discharging element in the lower end of said receptacle, and cooling devices interposed between said worm and discharging element.

In testimony whereof we have signed our names to this specification.

LUDWIG HONIGMANN.
FRIEDRICH BARTLING.